United States Patent
Arntson et al.

(10) Patent No.: US 8,789,361 B2
(45) Date of Patent: Jul. 29, 2014

(54) DIESEL AFTERTREATMENT REGENERATION SYSTEM AND METHOD

(75) Inventors: Brian A. Arntson, Cedar Falls, IA (US); Eugene R. Theis, Cedar Falls, IA (US)

(73) Assignee: Deere & Company, Moline, IL (US)

(*) Notice: Subject to any disclaimer, the term of this patent is extended or adjusted under 35 U.S.C. 154(b) by 488 days.

(21) Appl. No.: 12/693,797

(22) Filed: Jan. 26, 2010

(65) Prior Publication Data

US 2011/0179775 A1    Jul. 28, 2011

(51) Int. Cl.
*F01N 3/00* (2006.01)
*F01N 3/035* (2006.01)
*F01N 3/025* (2006.01)
*F01N 9/00* (2006.01)

(52) U.S. Cl.
CPC ............... *F01N 9/002* (2013.01); *F01N 3/035* (2013.01); *F01N 3/0253* (2013.01); *F01N 2590/08* (2013.01); *F01N 2610/14* (2013.01); *F01N 2610/03* (2013.01); *Y02T 10/47* (2013.01); *F01N 2610/146* (2013.01)
USPC .................................. 60/295; 60/301; 60/311

(58) Field of Classification Search
USPC ........................... 60/295, 301, 311
See application file for complete search history.

(56) References Cited

U.S. PATENT DOCUMENTS

| | | | | |
|---|---|---|---|---|
| 4,403,473 A * | 9/1983 | Gladden | ........................ | 60/274 |
| 4,503,830 A * | 3/1985 | Nakamura et al. | ............ | 123/501 |
| 5,207,990 A * | 5/1993 | Sekiya et al. | ................ | 422/183 |
| 5,809,774 A * | 9/1998 | Peter-Hoblyn et al. | ......... | 60/274 |
| 5,857,448 A * | 1/1999 | Ofner et al. | .................... | 123/525 |
| 5,976,475 A * | 11/1999 | Peter-Hoblyn et al. | ....... | 423/212 |
| 5,992,141 A * | 11/1999 | Berriman et al. | ............... | 60/274 |
| 6,279,603 B1 * | 8/2001 | Czarnik et al. | ................ | 137/339 |
| 6,810,661 B2 * | 11/2004 | Lambert et al. | ................ | 60/286 |
| 7,430,856 B2 * | 10/2008 | Miyazaki et al. | .............. | 60/287 |
| 7,644,579 B2 * | 1/2010 | Roberts et al. | ................. | 60/286 |
| 7,654,080 B2 * | 2/2010 | Ripper et al. | .................... | 60/286 |
| 7,930,878 B2 * | 4/2011 | Cook et al. | ..................... | 60/286 |
| 8,381,514 B2 * | 2/2013 | Salanta et al. | .................. | 60/286 |
| 2005/0247048 A1 * | 11/2005 | Schaller et al. | ................. | 60/286 |
| 2007/0061064 A1 | 3/2007 | Dollmeyer et al. | | |
| 2007/0283681 A1 * | 12/2007 | Makkee et al. | .................. | 60/274 |
| 2008/0041037 A1 * | 2/2008 | Kass et al. | ....................... | 60/286 |
| 2008/0236554 A1 * | 10/2008 | Rapp et al. | ..................... | 123/672 |
| 2008/0245058 A1 * | 10/2008 | Boddy et al. | ..................... | 60/286 |
| 2009/0050109 A1 | 2/2009 | Hoffmann et al. | | |

FOREIGN PATENT DOCUMENTS

WO    2005005797 A2    1/2005

* cited by examiner

*Primary Examiner* — Thomas Denion
*Assistant Examiner* — Patrick Maines
(74) *Attorney, Agent, or Firm* — Quarles & Brady LLP

(57) ABSTRACT

A diesel engine including at least one combustion chamber having an exhaust flow therefrom. An injection pump having a plurality of fuel outlets has a corresponding fuel outlet for each of the plurality of fuel outlets that are in controlled fluid communication with the at least one combustion chamber. At least one aftertreatment device is configured for the exhaust flow to travel therethrough. A fuel injector is positioned to inject fuel into the exhaust flow prior to the exhaust flow reaching the aftertreatment device. A valve receives fuel from at least one of the plurality of fuel outlets and the valve is configured to divert a portion of the fuel received by the valve to the fuel injector.

17 Claims, 3 Drawing Sheets

DIESEL AFTERTREATMENT REGENERATION SYSTEM AND METHOD

BACKGROUND OF THE INVENTION

1. Field of the Invention

The present invention relates to a method and apparatus to control the regeneration of a diesel aftertreatment device, and, more particularly, to a method and apparatus used to regenerate a diesel aftertreatment device using an injection pump to provide the pressurized fuel thereto.

2. Description of the Related Art

In modern low emission diesel engines, the fuel and air mixture is controlled and an exhaust gas recirculation system is utilized to reduce the NOx during steady state engine operation. Typically, the exhaust system directs the exhaust flow through a diesel oxidization catalyst, also known as a three-way catalyst, and through a diesel particulate filter. These devices are generally understood to be aftertreatment devices used to clean the exhaust before releasing the exhaust to the ambient atmosphere. Some aftertreatment devices require a burn off of the elements collected therein and, in order to accomplish this, diesel fuel is injected in some manner to facilitate the burn off.

The technology utilized to accomplish the burn off is typically expensive and complicated for the performance of the required task of regenerating, or self-cleaning the aftertreatment device, particularly for small diesel engines. The regeneration systems on large diesel engines typically use a high-pressure common rail injection system to provide the extra fuel on the exhaust stroke of the engine to thereby pump the fuel into the aftertreatment system. However, such a system is inordinately expensive for a small diesel engine.

What is needed in the art is a method and apparatus to regenerate an aftertreatment device for a small diesel engine without the need for a common rail injector system and the problems associated with that type of process.

SUMMARY OF THE INVENTION

The present invention relates to a method and apparatus for regenerating aftertreatment devices on small diesel engines.

The invention in one form is directed to a diesel engine having at least one combustion chamber having an exhaust flow therefrom. An injection pump having a plurality of fuel outlets has a corresponding fuel outlet for each of the plurality of fuel outlets that are in controlled fluid communication with the at least one combustion chamber. At least one aftertreatment device is configured for the exhaust flow to travel therethrough. A fuel injector is positioned to inject fuel into the exhaust flow prior to the exhaust flow reaching the aftertreatment device. A valve receives fuel from at least one of the plurality of fuel outlets and the valve is configured to divert a portion of the fuel received by the valve to the fuel injector.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention and such exemplifications are not to be construed as limiting the scope of the invention in any manner.

DETAILED DESCRIPTION OF THE INVENTION

Figure 1:
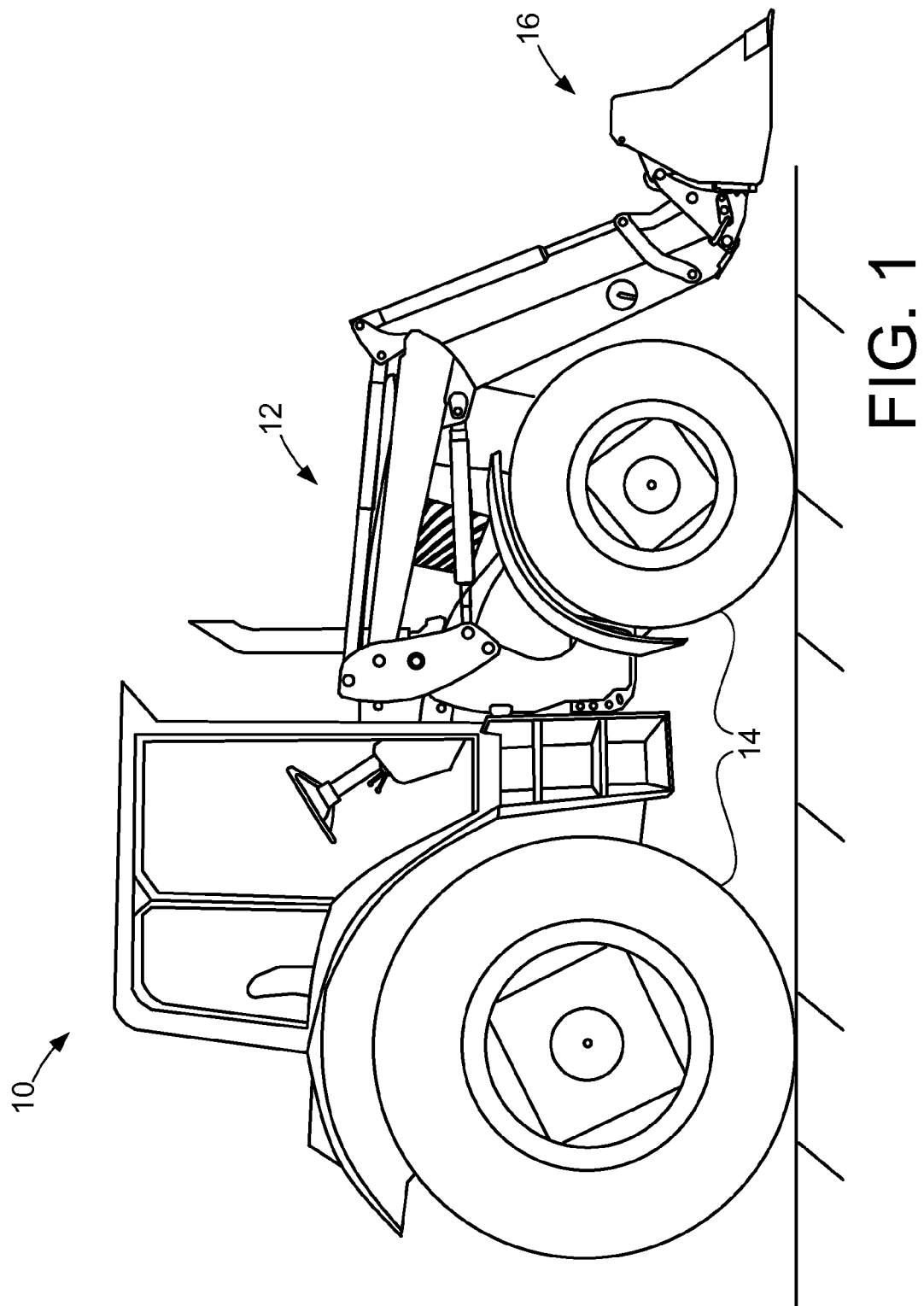
FIG. 1 is a vehicle having a diesel engine utilizing an embodiment of the aftertreatment regeneration system and method of the present invention.

Referring now to the drawings, and more particularly to FIG. 1, there is illustrated a vehicle 10 in the form of an agricultural vehicle 10, also known as a tractor 10, having a diesel engine 12 that provides motive force for use in a propulsion system having wheels 14. Power from diesel engine 12 also is utilized to move bucket 16, also known as a tool 16. Although vehicle 10 is illustrated as a tractor 10, it is to be understood that the present invention relates to any vehicle 10, and, more generally, to any power generating system 12 such as a small diesel engine 12. As discussed above, the present invention is directed to small diesel engines and, for the sake of clarity, a three-cylinder diesel engine will be used in the discussion to follow although other small diesel engines of another cylinder count could likewise be utilized.

Figure 2:
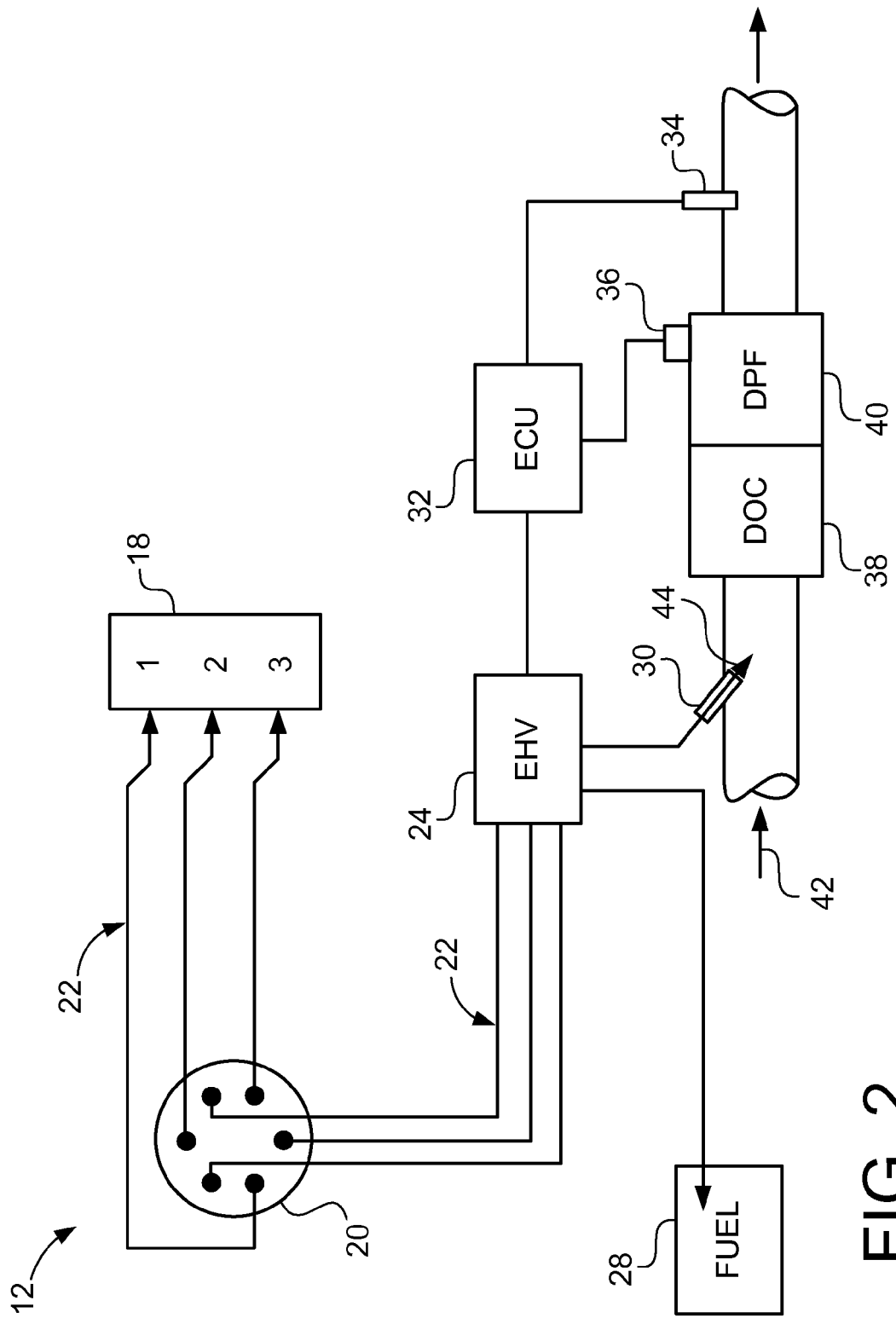
FIG. 2 is a block diagram illustrating elements of the engine of FIG. 1.

Now, additionally referring to FIG. 2, there are illustrated elements of engine 12 including the three cylinder engine block 18 having combustion chambers 1, 2, and 3 as illustrated therein. The engine 12 can be of any configuration having N combustion chamber(s) producing exhaust flow, N being a non-zero positive integer equal to at least one, such that N=3 in the engine 12 of the illustrated example. Engine 12 additionally includes an injection pump 20, injection lines 22, an electrohydraulic valve 24, return line 26, fuel tank 28, a fuel injector 30, a controller 32, a temperature sensor 34, a pressure sensor 36, a diesel oxidization catalyst 38, and a diesel particulate filter 40. Injection pump 20 provides fuel to the combustion chambers 18 by way of injection lines 22. Note that injection pump 20 is illustrated as a rotatory six-plunger injection pump 20, which would typically be utilized on a six-cylinder diesel engine. Here, in order to preserve the geometry, three of the plungers are connected to injection lines 22 directed to the engine combustion chambers 18 while three of the injector lines 22 are directed to electrohydraulic valve 24. Now, there is an advantage of the symmetry of utilizing an injection pump 20 having a whole number multiple of injection plungers as compared to the number of cylinders in engine block 18. This economic use of existing technology in the form of the six-cylinder rotary injection pump provides the pressurized fuel utilized by the present invention. However, it should be noted that the fuel injection pump 20 can have N+X fuel outlets, X also being a non-zero positive integer equal to at least one, such that N+X=3+3 in the rotatory six-plunger injection pump 20 of the illustrated example. Thus, each of the lines 22 separately connects a corresponding one of the N fuel outlet(s) of the injection pump 20 to a corresponding one of the N combustion chamber(s) and a corresponding one of the X fuel outlet(s) of the injection pump 20 to the electrohydraulic valve 24. Electrohydraulic valve (EHV) 24 is under the operative control of controller 32, which may be an engine control unit (ECU) 32. Electrohydraulic valve 24 may be simply an on/off valve utilized to direct the fuel flow from injector lines 22 to either injector 30 or return line 26. Alternatively, electrohydraulic valve 24 may be a proportional valve that is used to proportion the flow from lines 22 through valve 24 to injector 30. Fuel not directed to injector 30 is sent by way of return line 26 to fuel tank 28. Diesel engines typically have return lines from injectors and/or the injector pump so that when a relief feature of the plungers in the injection pump is triggered, the excess pressure in the fuel lines is bled off through a return line back to the fuel tank. Although typically utilized on a diesel engine, many of these details are not shown. Only one return line 26 is illustrated to more conveniently convey the operating mode of the present invention.

Controller 32, in addition to being in communication with electrohydraulic valve 24, receives information from temperature sensor 34 and from pressure sensor 36. Sensors 34 and 36 allow controller 32 the capability of determining the temperature in the exhaust flow as well as backpressure developed in diesel particulate filter 40. This, along with perhaps other operating information, allows controller 32 to compensate for operating conditions of diesel engine 12, and to decide upon a time to start a regeneration process of the aftertreatment devices—catalyst 38 and/or diesel particulate filter 40.

Exhaust coming from combustion chambers 1, 2, and 3 of three combustion cylinder block 18 is illustrated schematically as exhaust flow 42 flowing through an exhaust pipe towards diesel oxidization catalyst 38. When controller 32 decides to start a regeneration cycle, electrohydraulic valve 24 is turned on to allow either a full or a proportional selected flow of fuel coming from injection lines 22 to be directed to injector 30 so that fuel flow 44 enters into exhaust flow 42 directed at the aftertreatment devices. This fuel injected into the exhaust flow causes a burn off of the particulate matter or other deposits so that the aftertreatment devices can have their life extended for further cleaning of the exhaust from engine 12.

Figure 3:
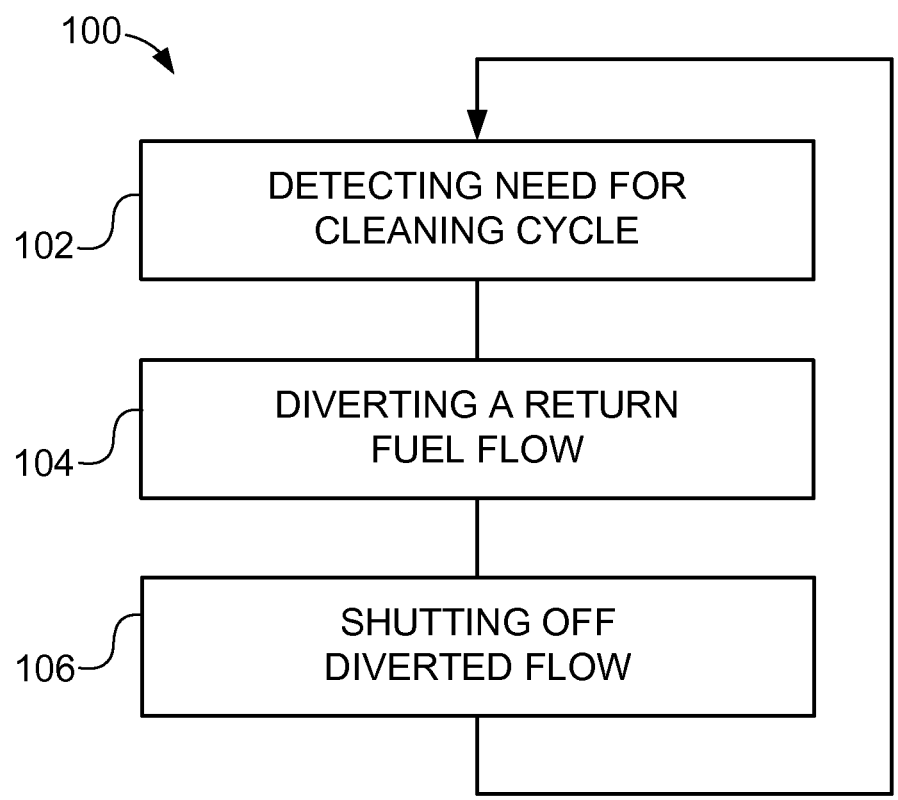
FIG. 3 illustrates steps of an embodiment of a method utilized in the apparatus of FIG. 2.

Now, additionally referring to FIG. 3, there is illustrated a method 100 including step 102 where the need for a cleaning cycle of the aftertreatment devices is detected by controller 32. In step 104, controller 32 diverts a return fuel flow that would normally go to fuel tank 28 by way of return line 26 to injector 30 so that a portion of the fuel is then injected as a fuel flow 44 into exhaust flow 42. At step 106, electrohydraulic valve 24 is shut off so that the diverted flow is no longer sent to injector 30 but then the continuous flow from injector lines 22 going to electrohydraulic valve 24 flows entirely to fuel tank 28.

The present invention eliminates the need to have a common rail system and the problems associated with such a process, which is particularly geared towards large diesel engines. The present invention utilizes a conventional rotary injection pump 20 and has the advantage of using an electrohydraulic valve 24 tied to three outlets of injection pump 20. Although not illustrated, check valves on these lines may additionally be utilized and may be considered incorporated within the electrohydraulic valve 24 device. Electrohydraulic valve 24 is used to divert fuel that would be recirculating back to fuel tank 28 to the exhaust system when needed for regeneration of the after treatment devices. Electrohydraulic valve 24 may have a default condition in which fuel is directed to fuel tank 28 unless electrohydraulic valve 24 is energized by action of controller 32.

The present invention advantageously reduces the cost of fuel injection components since available injection pumps for larger number of cylinder engines is utilized. Another advantage of the present invention is that it lowers the potential of engine damage due to the elimination of oil contamination with fuel, which is found in post combustion injection systems that are utilized with common rail injection systems. Another advantage of the present invention is that the production cost of this system is decreased over the more expensive common rail injection system.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An aftertreatment regeneration device for an engine having N combustion chamber(s) and producing an exhaust flow, the device comprising:
   a valve;
   a fuel injection pump having a pump body defining N+X fuel outlets each coupled to a corresponding one of a plurality of fuel lines, said N and X each being a positive integer greater than one and said fuel injection pump separately directing fuel from each of said N fuel outlet(s) through the corresponding one of said fuel lines to a corresponding one of said N combustion chamber(s) and from each of said X fuel outlet(s) through the corresponding one of said fuel lines to said valve;
   a fuel injector configured to inject fuel received from said valve into said exhaust flow; and
   at least one aftertreatment device receiving said exhaust flow from said engine and said fuel injected by said fuel injector.

2. The device of claim 1, wherein said fuel injection pump has an even multiple of said fuel outlets for every one of said combustion chambers.

3. The device of claim 1, wherein said engine further includes a controller configured to detect a need for said aftertreatment device to be regenerated, said controller being further configured to control said valve.

4. The device of claim 3, further comprising a fuel storage tank, said valve being configured to direct the fuel to one of said fuel storage tank and said fuel injector.

5. The device of claim 4, wherein said valve has a default position directing the fuel to said fuel storage tank.

6. A diesel engine, comprising:
   N combustion chamber(s) producing an exhaust flow;
   a valve;
   a fuel injection pump having a pump body defining N+X fuel outlets, said N and X each being a positive integer greater than one and said fuel injection pump configured to separately direct fuel from each of said N fuel outlet(s) to a corresponding one of said N combustion chamber(s) and from each of said X fuel outlet(s) to said valve;
   a fuel injector configured to receive fuel from said valve and to inject said fuel received from said valve into said exhaust flow; and
   at least one aftertreatment device receiving said exhaust flow from said N combustion chamber(s) and said fuel injected by said fuel injector.

7. The engine of claim 6, wherein there are multiple of said combustion chambers and wherein said fuel injection pump has multiple of said combustion fuel outlets, a corresponding one for every one of said combustion chambers.

8. The engine of claim 7, wherein said fuel injection pump has multiple of said aftertreatment fuel outlets.

9. The engine of claim 7, further including fuel lines wherein each said fuel line separately connects one of said combustion fuel outlets of said fuel injection pump to a corresponding one of said combustion chamber and one of said aftertreatment fuel outlets of said fuel injection pump to said valve.

10. The engine of claim 9, wherein said engine further includes a controller configured to detect a need for said aftertreatment device to be regenerated, said controller being further configured to control said valve.

11. The engine of claim 10, further comprising a fuel storage tank, said valve being configured to direct the fuel to one of said fuel storage tank and said fuel injector.

12. The engine of claim 11, wherein said valve has a default position directing the fuel to said fuel storage tank.

13. A method of regenerating an aftertreatment device connected to a diesel engine having N combustion chamber(s), the method comprising the steps of:
    providing a fuel injection pump having a pump body defining N+X fuel outlets, said N and X each being a positive integer greater than one, wherein said injection pump sends fuel from each of said N fuel outlet(s) to a corresponding one of said N combustion chamber(s) and from each of said X fuel outlet(s) to a valve;
    controlling said valve to selectively send fuel from said valve to a fuel injector; and
    injecting fuel received by said fuel injector into an exhaust gas flow traveling toward the aftertreatment device.

14. The method of claim 13, wherein the diesel engine has multiple combustion chambers and wherein said fuel injection pump has multiple of said combustion fuel outlets, a corresponding one for every one of said combustion chambers.

15. The method of claim 14, wherein said fuel injection pump has multiple of said aftertreatment fuel outlets.

16. The method of claim 15, further providing fuel lines wherein each said fuel line separately connects one of said combustion fuel outlets of said fuel injection pump to a corresponding one of said combustion chamber and one of said aftertreatment fuel outlets of said fuel injection pump to said valve.

17. The method of claim 13, further including: providing a fuel storage tank, and wherein said valve has a default position wherein fuel is sent to said fuel storage tank rather than said fuel injector.

* * * * *